US012535081B1

(12) United States Patent
Zheng

(10) Patent No.: US 12,535,081 B1
(45) Date of Patent: Jan. 27, 2026

(54) DETACHABLE FAN

(71) Applicant: Hangzhou Juxing Intelligent Technology Co., Ltd., Hangzhou (CN)

(72) Inventor: Hongbing Zheng, Hangzhou (CN)

(73) Assignee: Hangzhou Juxing Intelligent Technology Co., Ltd., Hangzhou (CN)

( * ) Notice: Subject to any disclaimer, the term of this patent is extended or adjusted under 35 U.S.C. 154(b) by 0 days.

(21) Appl. No.: 19/215,310

(22) Filed: May 21, 2025

(30) Foreign Application Priority Data

Apr. 3, 2025 (CN) ........................ 202520629216.8

(51) Int. Cl.
*F04D 29/34* (2006.01)
*F04D 19/00* (2006.01)

(52) U.S. Cl.
CPC ........... *F04D 29/34* (2013.01); *F04D 19/002* (2013.01); *F05D 2260/31* (2013.01); *F05D 2300/43* (2013.01)

(58) Field of Classification Search
CPC ...... F04D 29/34; F04D 29/329; F04D 29/646; F04D 29/322; F04D 29/20; F05D 2260/36
See application file for complete search history.

(56) References Cited

U.S. PATENT DOCUMENTS 1,096,079 A * 5/1914 Viall ........................ F04D 29/34 416/212 R
1,121,335 A * 12/1914 Dilg ........................ F04D 29/34 416/240
1,184,168 A * 5/1916 Dodson ................... F04D 29/34 29/889.6
1,260,562 A * 3/1918 McIntosh ................ F04D 29/34 416/212 R
1,588,986 A * 6/1926 Ohlson ................... F04D 29/34 416/212 R
2,559,831 A * 7/1951 Roffy ...................... F04D 29/34 416/212 R
5,354,177 A * 10/1994 Chang ..................... F04D 29/34 416/220 A
11,268,535 B2 * 3/2022 Lin ........................ F04D 29/624
2005/0271509 A1 * 12/2005 Chang ..................... F04D 29/34 416/204 R
2008/0219847 A1 * 9/2008 Guzorek ............. F04D 29/2222 416/185

(Continued)

*Primary Examiner* — Eldon T Brockman
(74) *Attorney, Agent, or Firm* — IPRTOP LLC

(57) ABSTRACT

A detachable fan is provided. The fan includes a motor provided with a main shaft extending axially, fan blade assemblies including blade portions circumferentially assembled to enclose a complete circular fan and sleeve portions, and a retaining cap fixed to a top end of the main shaft and in contact with top end surfaces of the sleeve portions to restrict upward movement of the fan blade assemblies along the main shaft. A blocking member is provided on a side wall of the main shaft. The sleeve portions are sequentially stacked along an axial direction of the main shaft, and a lowermost sleeve portion abuts against the blocking member. The present application reduces packaging volume and transportation costs by dividing a conventional integrated blade set into multiple individually detachable fan blade assemblies, which can be separately packaged and stacked, and is particularly well-suited for the logistics and warehousing of large-sized fans.

13 Claims, 6 Drawing Sheets

(56) References Cited

U.S. PATENT DOCUMENTS

| | | | | |
|---|---|---|---|---|
| 2009/0155080 | A1* | 6/2009 | Yu | F04D 29/34<br>416/212 R |
| 2009/0155081 | A1* | 6/2009 | Yu | F04D 25/0613<br>416/219 R |
| 2016/0131152 | A1* | 5/2016 | Wang | F04D 19/002<br>416/214 R |
| 2023/0143101 | A1* | 5/2023 | Harris | F04D 29/601<br>416/210 R |

* cited by examiner

DETACHABLE FAN

CROSS-REFERENCE TO RELATED APPLICATION

The present application claims the benefit of priority to Chinese Patent Application No. 202520629216.8, entitled "DETACHABLE FAN", filed with CNIPA on Apr. 3, 2025, the disclosure of which is incorporated herein by reference in its entirety for all purposes.

FIELD OF THE INVENTION

The present application relates to the technical field of electric fans, and in particular to a detachable fan.

BACKGROUND OF THE INVENTION

At present, fan products on the market commonly employ an integrated fan blade structural design. While such a design benefits from well-established manufacturing techniques, it suffers from several limitations in actual use. As the size of the fan products increases, the transportation, storage, and usage of the integrated blade set face significant challenges. During transportation, the large-sized fan products take up considerable space, leading to higher logistics costs and an increased risk of damage due to collisions. In terms of storage, the integrated blade set requires significant warehouse space, increasing inventory management costs for businesses. During use, if any part of the fan blades is damaged, it often requires a full replacement, resulting in resource waste. In addition, although traditional split-type fan blades somewhat alleviate transportation and storage challenges, their reliance on bolted connections often results in complex assembly and poor connection stability. Furthermore, the traditional split-type fan blades tend to generate vibrations and noise during high-speed operation, which adversely affects the user experience.

A new fan blade structure is urgently needed to address these issues in the prior art, as it can ensure connection stability and operational reliability while meeting the requirements for convenient transportation and flexible assembly.

SUMMARY OF THE INVENTION

The present application provides a detachable fan.

The detachable fan includes a motor provided with a main shaft extending axially, at least two fan blade assemblies, and a retaining cap. A blocking member is provided on a side wall of the main shaft. The fan blade assemblies include blade portions and sleeve portions.

The blade portions of the fan blade assemblies are circumferentially assembled to enclose a complete circular fan. The sleeve portions are sequentially stacked along an axial direction of the main shaft, and a lowermost sleeve portion abuts against the blocking member. The retaining cap is fixed to a top end of the main shaft and in contact with top end surfaces of the sleeve portions of the fan blade assemblies to restrict upward movement of the fan blade assemblies.

In one embodiment of the present application, radially extending ends of the blade portions are located on a same circumference.

In one embodiment of the present application, the sleeve portions include arcuate side walls and sleeves connected to inner sides of the arcuate side walls. Connection positions of the sleeves on the inner sides of the corresponding arcuate side walls are distributed in a gradually descending manner along the axial direction. When the sleeves are stacked along the axial direction of the main shaft, end surfaces of adjacent sleeves are closely fitted in the axial direction, and a total axial height of the sleeves is equal to an axial length of a cylindrical shell formed by the arcuate side walls.

In one embodiment of the present application, the arcuate side walls of the fan blade assemblies subtend an equal central angle, and the sleeves of the fan blade assemblies have a same axial height.

In one embodiment of the present application, the top end of the main shaft is provided with an external thread structure, and a center of the retaining cap is provided with an internal thread hole matched to the external thread structure. The retaining cap is screwed and fastened to the external threaded structure on the top end of the main shaft through the internal threaded hole, with bottom end surface of the retaining cap pressed tightly against the top end surfaces of the arcuate side walls of the sleeve portions.

In one embodiment of the present application, at least one protruding rib is provided on each of the top end surfaces of the arcuate side walls of the sleeve portions, and at least one limit groove is provided on the bottom end surface of the retaining cap at a position corresponding to the protruding rib. When the retaining cap is fastened to the top end of the main shaft, the protruding rib is engaged with the limit groove to form a circumferential constraint on the retaining cap.

In one embodiment of the present application, a number of protruding ribs are provided corresponding to a number of the arcuate side walls. The protruding ribs are arranged circumferentially at intervals, and the protruding ribs collectively form a complete or incomplete annular structure.

In one embodiment of the present application, the arcuate side walls are provided with connecting members configured to circumferentially connect the fan blade assemblies at connection positions of the fan blade assemblies.

Preferably, the connecting members include connecting teeth and connecting grooves engaged with the connecting teeth. The arcuate side walls include first ends and second ends along a circumferential direction. The connecting teeth are disposed on the first ends of the arcuate side walls, and the connecting grooves are disposed on the second ends of the arcuate side walls.

Preferably, cross sections of the connecting grooves are trapezoidal, and the connecting teeth are contoured to match the connecting grooves.

In one embodiment of the present application, the blocking member is a transverse metal rod, and a lowermost sleeve portion is provided with a notch matched to the transverse metal rod. When the lowermost fan blade assembly is mounted in place, the transverse metal rod is engaged with the notch of the lowermost sleeve portion.

In one embodiment of the present application, centers of the sleeve portions are provided with axial through-holes. The axial through-holes and the main shaft are clearance-fitted and coaxially arranged.

In one embodiment of the present application, the fan blade assemblies are made of polycarbonate material.

As described above, the detachable fan of the present application has the following beneficial effects.

(1) The present application significantly reduces packaging volume and transportation costs by dividing a conventional integrated blade set into multiple individually detachable fan blade assemblies, which can be separately packaged and stacked, and is particularly well-suited for the logistics and warehousing of large-sized fans.

(2) Due to the gradient-decreasing design of the sleeve portions of the blade assemblies, in coordination with the blocking member of the main shaft and the top retaining cap, all components can be precisely positioned and reliably secured simply by tightening the retaining cap. The present application significantly simplifies the assembly process and improves disassembly and reassembly efficiency.

(3) The present application effectively suppresses vibration amplitude and noise level during the fan's operation by utilizing multiple positioning mechanisms, including the fit between the blocking member and the notch, end-face abutment of the sleeves, and circumferential constraint imposed on the retaining cap, thereby improving overall product performance and user satisfaction.

(4) The present application adopts high-strength engineering plastic in combination with a precisely designed clearance fit structure, which not only ensures the mechanical strength of the components but also prevents deformation caused by thermal expansion and contraction, thereby significantly extending the product's service life.

REFERENCE NUMERALS

Figure 1:
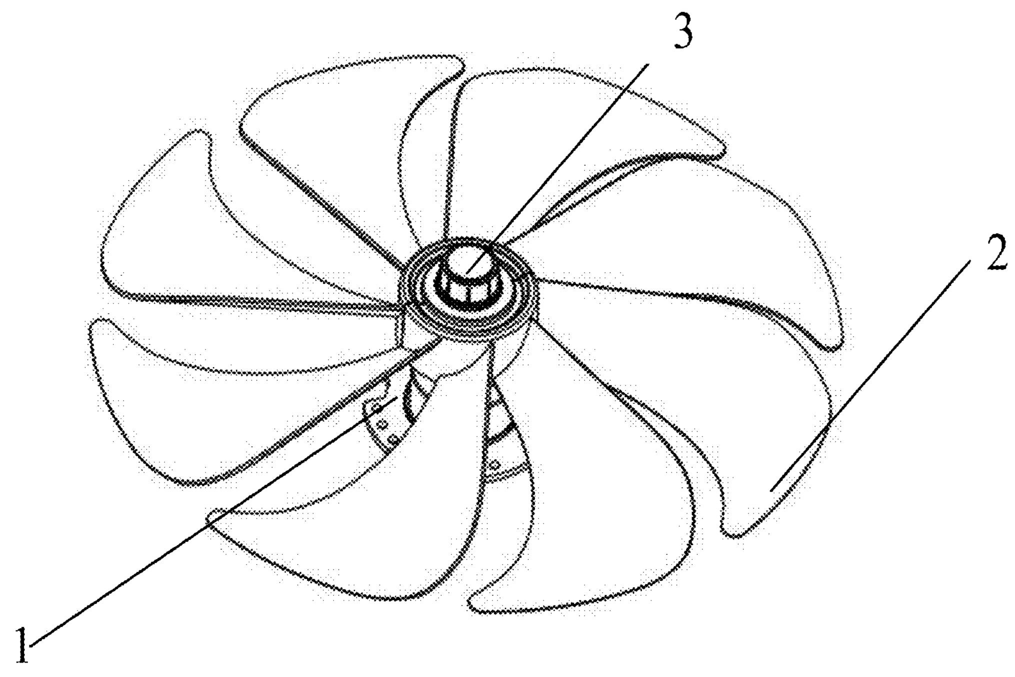
FIG. 1 is a front view of a detachable fan according to a first embodiment of the present application.

1 Motor
11 Main shaft
111 External thread structure
12 Blocking member
2 Fan blade assembly
21 Blade portion
22 Sleeve portion
221 Arcuate side wall
222 Sleeve
223 Axial through-hole
224 Protruding rib
225 Connecting tooth
226 Connecting groove
3 Retaining cap
31 Limit groove

DETAILED DESCRIPTION

The embodiments of the present application are described below through specific examples, and those skilled in the art can easily understand other advantages and effects of the present application from the content disclosed in the present specification. The present application can also be implemented or applied through other different specific embodiments, and various details in the specification can also be modified or changed based on different viewpoints and applications without departing from the spirit of the present application. It should be noted that the following embodiments and features in the embodiments may be combined with each other without conflict.

It should be noted that the drawings provided in the following embodiments are intended to schematically illustrate the basic concept of the present application. Therefore, the figures only show the components relevant to the present application, and are not drawn to represent the actual number, shape, and size of the components during actual implementation. The shape, quantity, and proportions of the components may vary in actual practice, and the layout of the components could also be more complex.

In addition, terms such as "first," "second," etc., used in the present application are only for descriptive purposes, and cannot be construed as indicating or implying any relative importance or implicitly specifying the number of the technical features. Thus, features defining "first" and "second" may explicitly or implicitly include at least one of the features. Furthermore, the technical solutions of the various embodiments may be combined with each other, provided that such combination is achievable by a person skilled in the art. If the combination of technical solutions leads to contradictions or becomes unachievable, it should be considered that such a combination does not exist and is not within the scope of protection claimed by the present application.

The following embodiments of the present application provide a detachable fan, which can not only meet the requirements for convenient transportation and flexible assembly, but also ensure connection stability and operation reliability.

Figure 2:
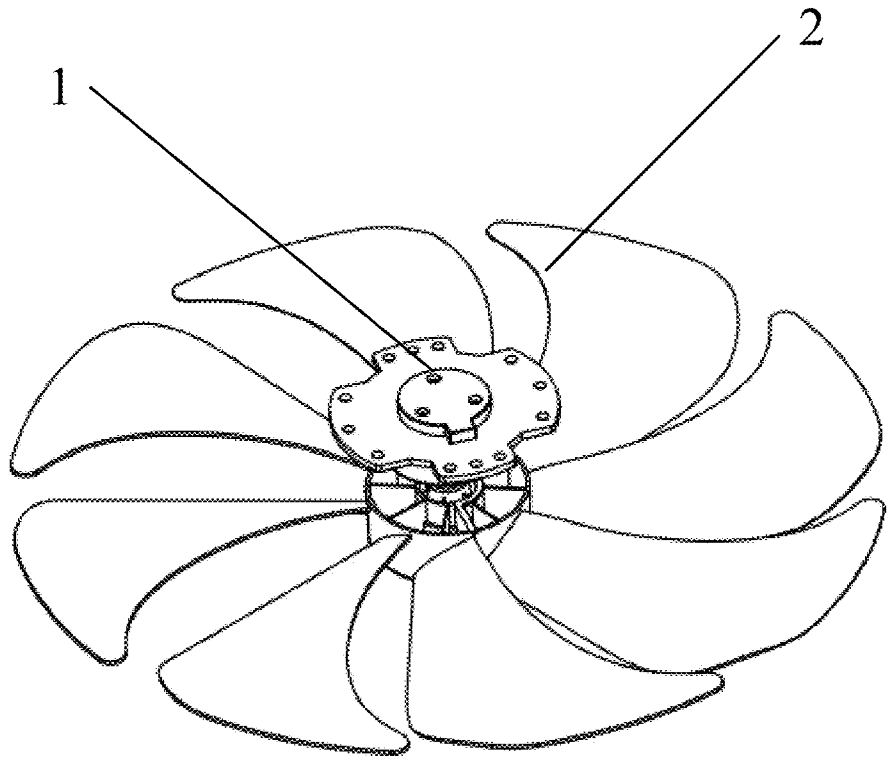
FIG. 2 is a rear view of a detachable fan according to a first embodiment of the present application.
Figure 3:
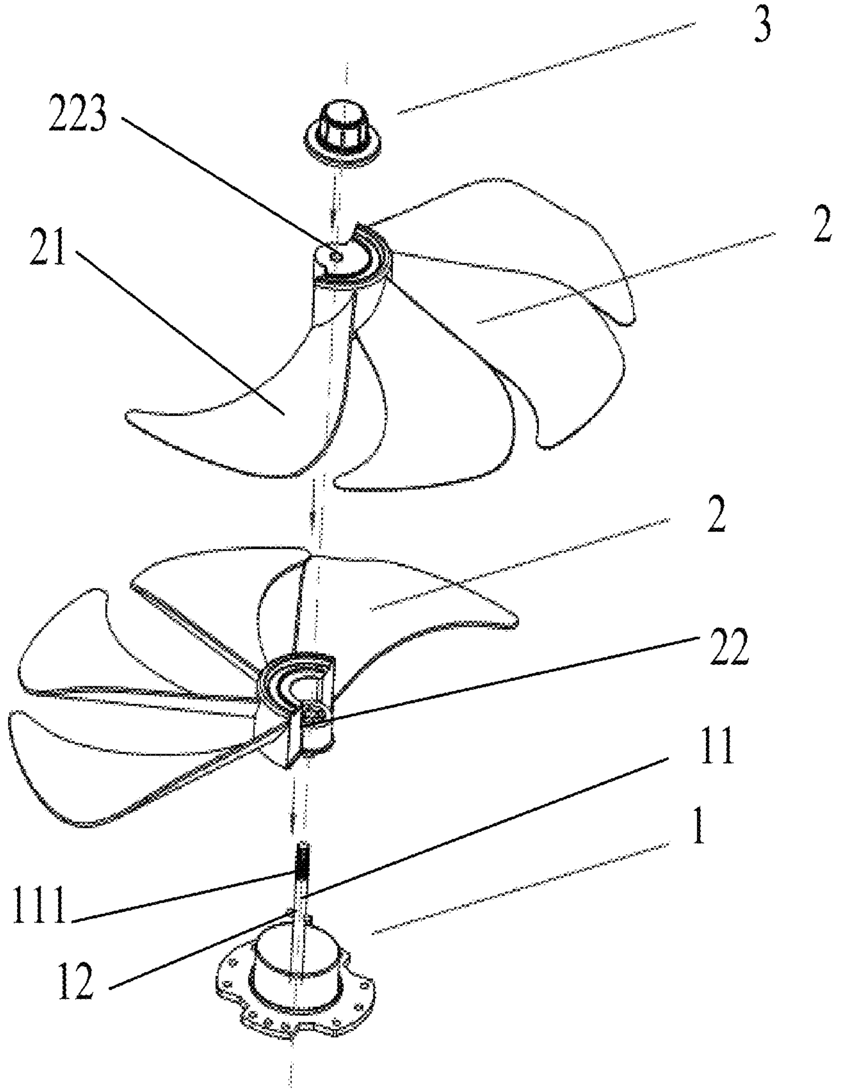
FIG. 3 is an exploded view of a detachable fan according to a first embodiment of the present application.

As shown in FIGS. 1-3, a detachable fan is provided according to a first embodiment of the present application. The detachable fan includes a motor 1, at least two fan blade assemblies 2, and a retaining cap 3. The structure and assembly relationship of each component are described in detail below with reference to the accompanying drawings. FIG. 1 is a front view of the detachable fan according to a first embodiment of the present application. FIG. 2 is a back view of the detachable fan according to a first embodiment of the present application. FIG. 3 is an exploded view of the detachable fan according to a first embodiment of the present application.

The motor 1 is provided with a main shaft 11 extending axially, and a blocking member 12 is provided on a side wall of the main shaft 11.

Specifically, the blocking member 12 is transversely fixed to a bottom region of the side wall of the main shaft 11. The blocking member 12 is preferably a rigid metal rod. The blocking member 12 is fixed in a through hole of the side wall of the main shaft 11 by welding or threading to form a limiting structure transversely penetrating the main shaft 11.

The fan blade assemblies 2 are sequentially assembled along an axial direction of the main shaft 11, and the fan blade assemblies 2 include blade portions 21 and sleeve portions 22. The blade portions 21 are integrally formed with the corresponding sleeve portions 22.

Specifically, the blade portions 21 are arc-shaped plates. The blade portions 21 are circumferentially connected in an end-to-end manner to form a complete circular fan.

Exemplarily, radially extending ends of the blade portions 21 are located on a same circumference to ensure dynamic balance of the fan during the rotation of the fan blades.

The sleeve portions 22 are disposed on inner roots of the blade portions 21, with axial through-holes 223 provided in the centers of the sleeve portions 22. The axial through-holes 223 are clearance-fitted to an outer wall of the main shaft 11, allowing the sleeve portions 22 to slide axially along the main shaft 11 while restricting radial displacement.

In some embodiments, the sleeve portions 22 include arcuate side walls 221 and sleeves 222 fixedly connected to inner sides of the arcuate side walls 221.

Specifically, a curvature of the arcuate side walls 221 matches the inner roots of the blade portions 21, and the arcuate side walls 221 of the fan blade assemblies 2 are circumferentially spliced to form a continuous cylindrical shell. Connection positions of the sleeves 222 on the inner sides of the arcuate side walls 221 are progressively distributed from top to bottom along the axial direction, so that when all the fan blade assemblies 2 are stacked, end surfaces of the adjacent sleeves 222 are closely fitted, and a total axial height of the sleeves 222 is consistent with the axial length of the cylindrical shell.

Exemplarily, the arcuate side walls 221 of the fan blade assemblies 2 each subtend an equal central angle, and the corresponding sleeves 222 have a same axial height, thereby ensuring the interchangeability between the assemblies.

During installation, a lowermost fan blade assembly 2 is first sleeved on the main shaft 11, and a notch at a bottom of a lowermost sleeve 222 is aligned with the blocking member 12 on the side wall of the main shaft 11. The notch is a groove structure adapted to the shape of the blocking member 12. When the lowermost sleeve 222 moves downward in place, the blocking member 12 is embedded in the notch to realize circumferential limiting of the lowermost sleeve 222. Then, the remaining fan blade assemblies 2 are stacked in sequence, and the gradient distribution design of the sleeves 222 ensures that the end surfaces of adjacent sleeves 222 are automatically aligned and closely fit during the stacking process. Finally, axial positions of all the assemblies are fixed by the retaining cap 3 to complete the assembly.

In this implementation, through circumferential splicing of the blade portions, gradient stacking of the sleeve portions, and cooperation of the blocking member and the notch, the fan blade assemblies can be rapidly assembled and disassembled with reliable fixation, while ensuring overall structural rigidity and operational stability.

Figure 4:
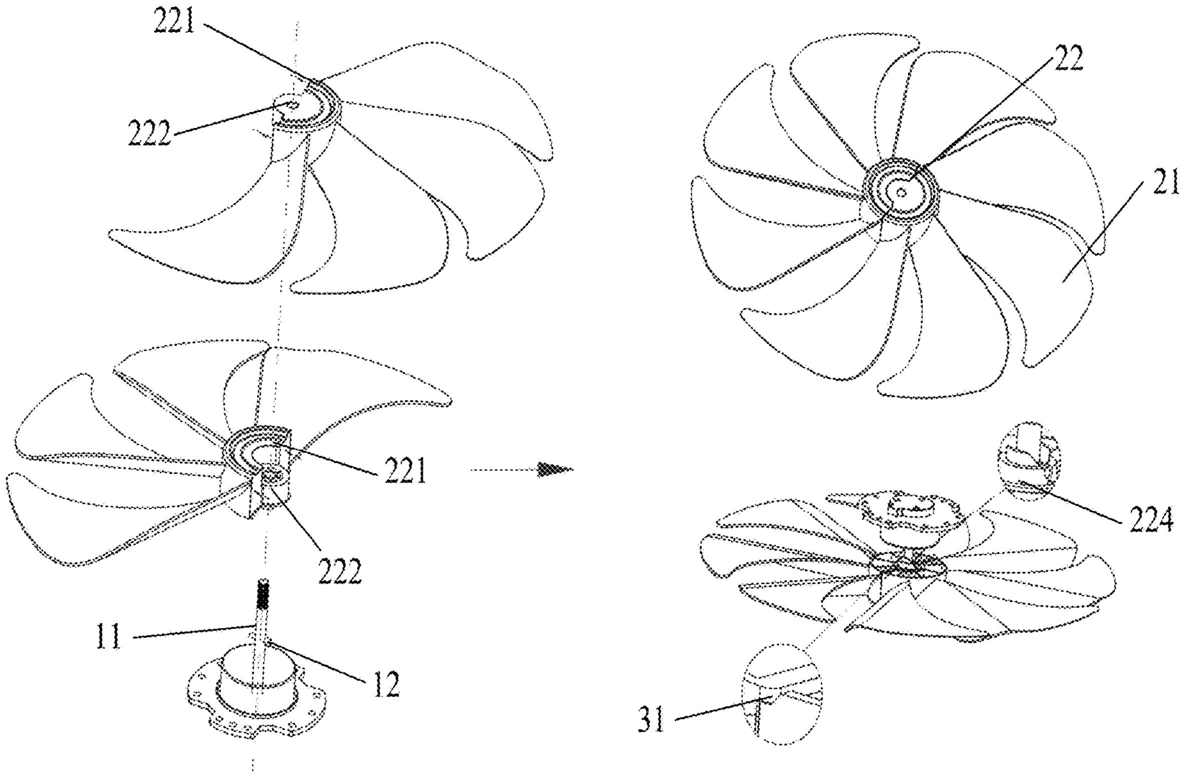
FIG. 4 is an assembly diagram of a detachable fan with two blade assemblies according to a first implementation of a first embodiment of the present application.

In specific assembly implementation, the number of the fan blade assemblies 2 can be flexibly configured according to actual needs. FIG. 4 is an assembly diagram of two blade assemblies. As shown in FIG. 4, the two blade assemblies 2 are distributed in a 180° symmetrical manner, and the blade portions 21 of the two blade assemblies 2 are circumferentially assembled to enclose a complete circular fan. At this time, the gradient distribution of the sleeve portion 22 exhibits that two sleeves 222 with equal heights are stacked from top to bottom along the main shaft 11, and the notch at the bottom of the lowermost sleeve 222 is accurately fitted with the blocking member 12 of the main shaft 11 to form an initial positioning reference.

Figure 5:
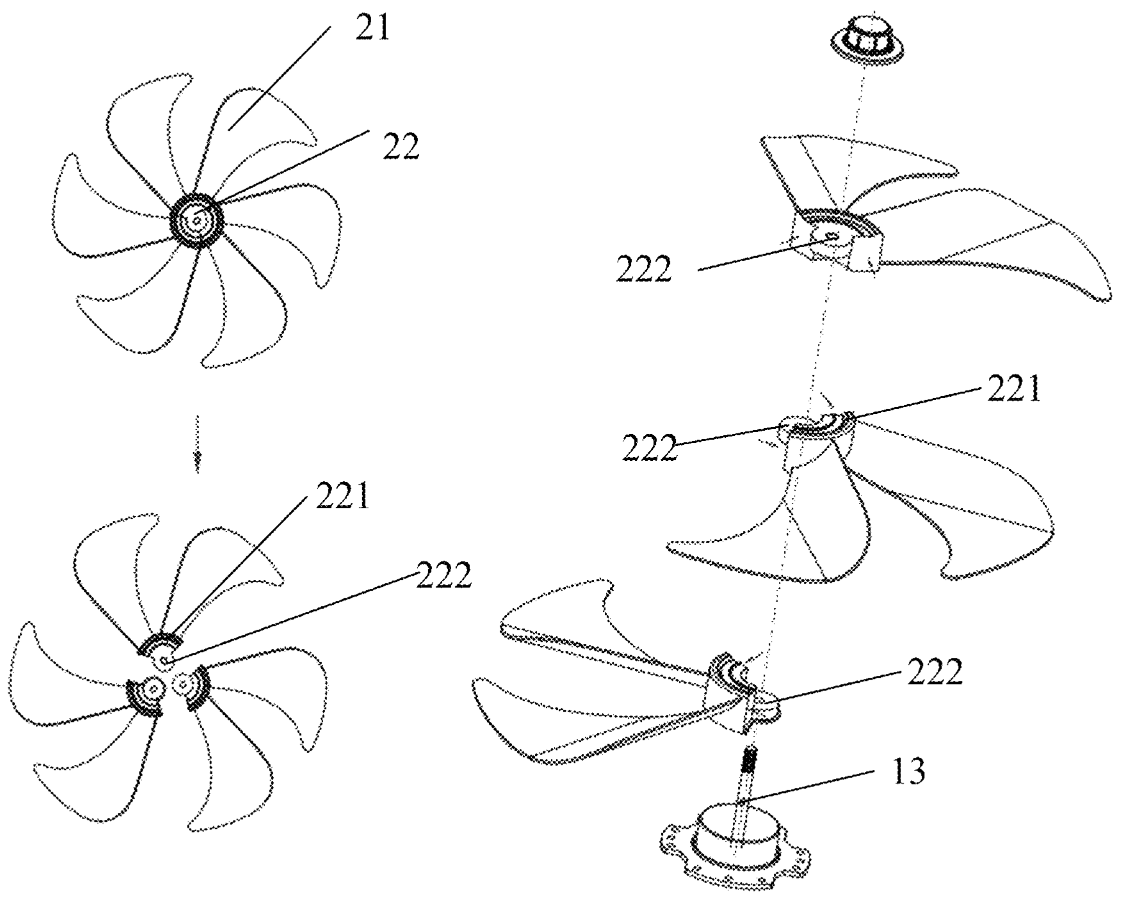
FIG. 5 is an assembly diagram of a detachable fan with three blade assemblies according to a second implementation of a first embodiment of the present application.

FIG. 5 is an assembly diagram of three blade assemblies. As shown FIG. 5, the three blade assemblies 2 are spaced at 120° intervals, and the arcuate side walls 221 of the blade portions 21 are seamlessly connected in the circumferential direction to form the cylindrical shell. In this embodiment, the connection positions of the three sleeves 222 are decreased progressively in equal steps in the axial direction. The end surfaces of the adjacent sleeves 222 are closely fitted after stacking, and a total height of the three sleeves 222 matches the axial length of the cylindrical shell precisely. During installation, the notch of the lowermost sleeve 222 is first engaged with the blocking member 12, and then the remaining sleeves 222 are self-aligned based on the gradient distribution, ensuring that no additional adjustment is required in the assembly process.

All embodiments, whether in the two-blade assemblies or three-blade assembly configuration, adhere to the same axial stacking principle: self-alignment assembly by the gradient distribution of the sleeves, circumferential constraint by the cooperation of the blocking member and the notch, and finally axial fixation by the retaining cap. This design allows for changing the number of fan blade assemblies by proportionally adjusting the sleeve gradient parameters, without changing the basic assembly logic, greatly improving the product's customizability.

In some embodiments, the fan blade assemblies 2 are integrally injection molded from a polycarbonate material. The blade portions 21 and the sleeve portions 22 of the fan blade assemblies 2 form a rigid structure that is seamlessly connected. The high-strength properties of polycarbonate allow the blade portions 21 to maintain a lightweight curved profile while withstanding the aerodynamic loads generated during high-speed rotation. Meanwhile, the sleeve portions 22 leverage the wear-resistant nature of polycarbonate to ensure long-term stability of the clearance fit with the main shaft 11.

The retaining cap 3 is a disc-shaped structure and is fixedly mounted on a top end of the main shaft 11. A bottom end surface of the retaining cap 3 is in direct contact with top end surfaces of the sleeve portions 22 of the fan blade assemblies 2. When the retaining cap 3 is axially fixed, the continuous clamping force exerted by the bottom end surface of the retaining cap 3 on the fan blade assemblies 2 prevents the fan blade assemblies 2 from moving upward along the axial direction of the main shaft 11, thereby forming a stable axial constraint.

Figure 6:
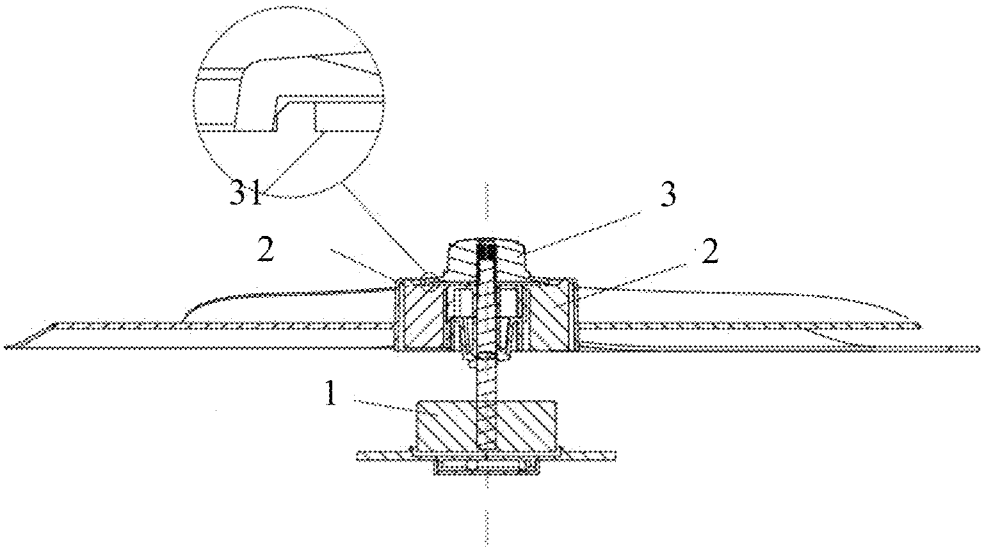
FIG. 6 is a cross-sectional view of a detachable fan according to a first embodiment of the present application.

In some embodiments, as shown in FIG. 6, the top end of the main shaft 11 is provided with an external thread structure 111, and a center of the retaining cap 3 is provided with an internal thread hole matched to the external thread structure 111. During assembly, the internal threaded hole of the retaining cap 3 is first aligned with the external threaded structure 111 on the top end of the main shaft 11, and then the external thread is screwed into the internal thread hole. The axial force generated by the threaded engagement tightly presses the bottom end surface of the retaining cap 3 against the top end surfaces of the sleeve portions 22. A length of the external thread structure 111 is configured to allow the screwed retaining cap 3 to provide sufficient clamping force when fully tightened, while preventing structural deformation caused by over-compression of the sleeve portions 22.

In some embodiments, strip-shaped protruding ribs 224 are provided on top end surfaces of the arcuate side walls 221 of the sleeve portions 22 to enhance the connection stability between the retaining cap 3 and the fan blade assemblies 2. The protruding ribs 224 extend circumferentially along the sleeve portions 22, with heights of the protruding ribs 224 slightly higher than the top end surfaces of the sleeve portions 22.

Correspondingly, limit grooves 31 matched to the protruding ribs 224 are provided on the bottom end surface of the retaining cap 3. When the retaining cap 3 is screwed and fastened into the top end of the main shaft 11, the protruding ribs 224 are engaged with the corresponding limit grooves 31 to form a circumferential constraint on the retaining cap 3. This structure prevents circumferential displacement of the retaining cap 3 caused by vibrations during the fan's operation and enhances the overall torsional resistance through the engagement between the protruding ribs 224 and the limit grooves 31.

In this implementation, a dual fixation mechanism is formed by providing axial clamping force through threaded fastening, combined with the circumferential constraint between the protruding ribs 224 and the limit grooves 31. During installation, axial fixation and circumferential positioning are simultaneously achieved by simply rotating the retaining cap, which greatly simplifies the assembly process and ensures the structural integrity of the fan during high-speed operation.

Figure 7:
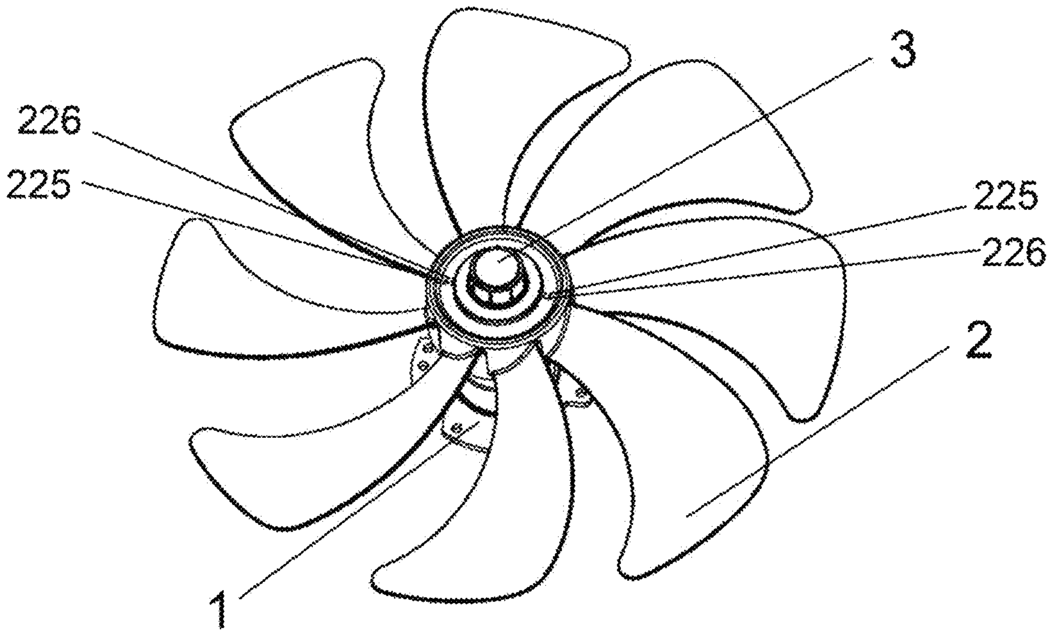
FIG. 7 is a front view of a detachable fan according to a second embodiment of the present application.
Figure 8:
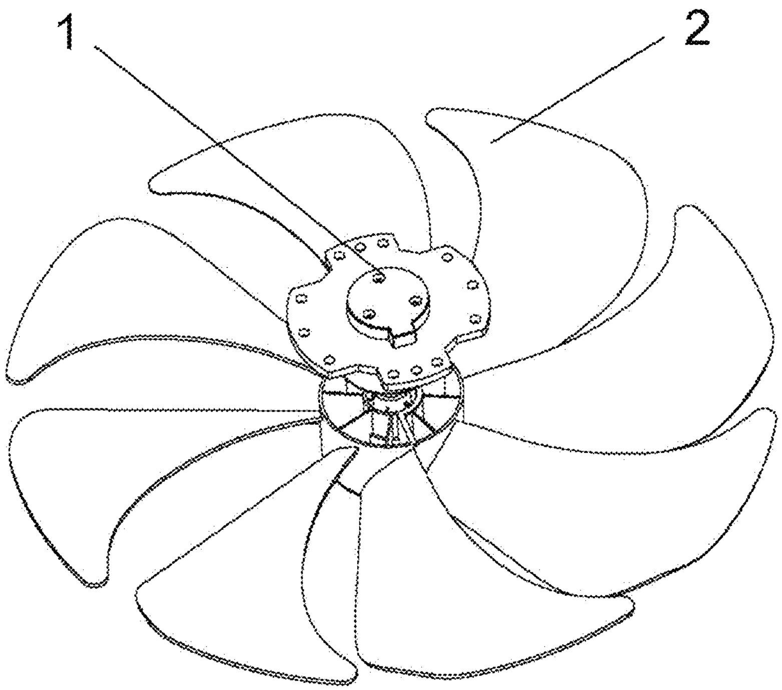
FIG. 8 is a rear view of a detachable fan according to a second embodiment of the present application.
Figure 9:
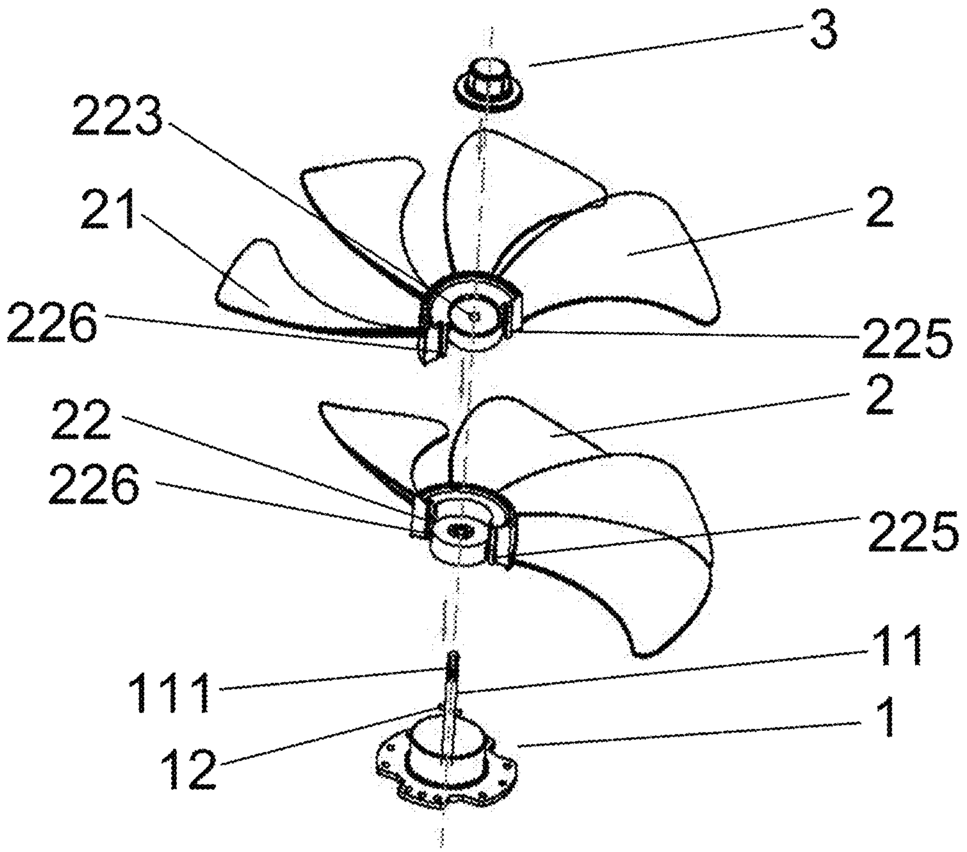
FIG. 9 is an exploded view of a detachable fan according to a second embodiment of the present application.

As shown in FIGS. 7-9, a detachable fan is provided according to a second embodiment of the present application. FIG. 7 is a front view of the detachable fan according to a second embodiment of the present application. FIG. 8 is a back view of the detachable fan according to a second embodiment of the present application. FIG. 9 is an exploded view of the detachable fan according to a second embodiment of the present application.

The difference between the second embodiment and the first embodiment of the present application is that: the arcuate side walls 221 are further provided with connecting members configured to circumferentially connect the fan blade assemblies 2 at connection positions of the fan blade assemblies 2 to prevent the fan blade assemblies 2 from loosening due to external forces or vibrations, thereby improving the stability of the overall structure of the fan. Specifically, the arcuate side walls 221 include first ends and second ends along the circumferential direction. The first and second ends of the arcuate side walls 22 of adjacent fan blade assemblies 2 are connected and secured by the connecting members. Preferably, the connecting members include interconnected connecting teeth 225 and connecting grooves 226. The connecting teeth 225 are provided on the first ends of the arcuate side walls 221, and the connecting grooves 226 matched to the connecting teeth 225 are provided on the second ends of the arcuate side walls 221. Preferably, cross sections of the connecting grooves 226 are trapezoidal, and the connecting teeth 225 are contoured to match the connecting grooves to ensure a reliable mechanical engagement, thereby preventing the connecting teeth 225 from accidentally disengaging from the connecting grooves 226. The remaining portions are similar to the first embodiment, and details are not described herein again.

In summary, the detachable fan according to the present application includes a motor assembly, split-type fan blade assemblies, and a retaining cap. An output shaft of the motor extends to form the main shaft, and the transverse blocking member is provided on the side wall of the main shaft. A plurality of separable fan blade assemblies is stacked and assembled along the axial direction of the main shaft through the sleeve portions. The fan blade assemblies include integrally formed blade portions and sleeve portions, and the blade portions of the fan blade assemblies are circumferentially assembled to enclose a complete circular fan. The sleeve portions are stacked in a gradient decreasing manner. The end surfaces of adjacent sleeves are closely fitted, and the lowermost sleeve is in limiting fit with the blocking member of the main shaft. The retaining cap is fixed to the top end of the main shaft by threads. The bottom end surface of the retaining cap is in contact with the top end surfaces of the sleeves to form an axial constraint, and circumferential positioning is realized through the cooperation of the protruding ribs and the limiting grooves. This design enables quick disassembly and easy transportation of the fan blades through a modular split structure, utilizes the gradient stacking of the sleeve portions to ensure assembly accuracy, and incorporates multiple fixing mechanisms to ensure operational stability. Moreover, the present application adopts a polycarbonate integral molding process to provide lightweight, high-strength, and weather-resistant products suitable for large-scale fan applications that require frequent disassembly and reassembly or long-distance transportation.

Descriptions of procedures or structures corresponding to the foregoing accompanying drawings have different focuses, and for a part that is not described in detail in a procedure or structure, refer to related descriptions of another procedure or structure.

The above embodiments are merely illustrative of the principles and effects of the present application, and are not intended to limit the present application. Any person skilled in the art can modify or change the above embodiments without departing from the spirit and scope of the present application. Therefore, all equivalent modifications or changes made by those skilled in the art without departing from the spirit and technical idea disclosed by the present application should still be covered by the claims of the present application.

The invention claimed is:

1. A detachable fan, comprising:

a motor, wherein the motor is provided with a main shaft extending axially, and a blocking member is provided on a side wall of the main shaft;

at least two fan blade assemblies comprising blade portions and sleeve portions, wherein:

the blade portions of the fan blade assemblies are circumferentially assembled to enclose a complete circular fan;

the sleeve portions are sequentially stacked along an axial direction of the main shaft, and a lowermost sleeve portion abuts against the blocking member; and a retaining cap fixed to a top end of the main shaft and in contact with top end surfaces of the sleeve portions of the fan blade assemblies to restrict upward movement of the fan blade assemblies along the main shaft.

2. The detachable fan according to claim 1, wherein radially extending ends of the blade portions are located on a same circumference.

3. The detachable fan according to claim 1, wherein the sleeve portions comprise arcuate side walls and sleeves connected to inner sides of the arcuate side walls, wherein connection positions of the sleeves on the inner sides of the corresponding arcuate side walls are distributed in a gradually descending manner along the axial direction;

when the sleeves are stacked along the axial direction of the main shaft, end surfaces of adjacent sleeves are closely fitted in the axial direction, and a total axial height of the sleeves is equal to an axial length of a cylindrical shell formed by the arcuate side walls.

4. The detachable fan according to claim 3, wherein the arcuate side walls of the fan blade assemblies subtend an equal central angle, and the sleeves of the fan blade assemblies have a same axial height.

5. The detachable fan according to claim 3, wherein:

the top end of the main shaft is provided with an external thread structure, and a center of the retaining cap is provided with an internal thread hole matched to the external thread structure;

the retaining cap is screwed and fastened to the external threaded structure on the top end of the main shaft through the internal threaded hole, with bottom end surface of the retaining cap pressed tightly against the top end surfaces of the arcuate side walls of the fan blade assemblies.

6. The detachable fan according to claim 3, wherein:

at least one protruding rib is provided on each of the top end surfaces of the arcuate side walls of the sleeve portions, and a limit groove is provided on the bottom end surface of the retaining cap at a position corresponding to the protruding rib;

when the retaining cap is fastened to the top end of the main shaft, the protruding rib is engaged with the limit groove to form a circumferential constraint on the retaining cap.

7. The detachable fan according to claim 6, wherein a number of protruding ribs are provided corresponding to a number of the arcuate side walls, wherein the protruding ribs are arranged circumferentially at intervals, and the protruding ribs collectively form a complete or incomplete annular structure.

8. The detachable fan according to claim 3, wherein the arcuate side walls are provided with connecting members configured to circumferentially connect the fan blade assemblies at connection positions of the fan blade assemblies.

9. The detachable fan according to claim 8, wherein the connecting members comprise connecting teeth and connecting grooves engaged with the connecting teeth, wherein the arcuate side walls include first ends and second ends along a circumferential direction, wherein the connecting teeth are disposed on the first ends of the arcuate side walls, and the connecting grooves are disposed on the second ends of the arcuate side walls.

10. The detachable fan according to claim 9, wherein cross sections of the connecting grooves are trapezoidal, and the connecting teeth are contoured to match the connecting grooves.

11. The detachable fan according to claim 1, wherein the blocking member is a transverse metal rod, and a lowermost sleeve portion is provided with a notch matched to the transverse metal rod; and when the lowermost fan blade assembly is mounted in place, the transverse metal rod is engaged with the notch of the lowermost sleeve portion.

12. The detachable fan according to claim 1, wherein centers of the sleeve portions are provided with axial through-holes, wherein the axial through-holes and the main shaft are clearance-fitted and coaxially arranged.

13. The detachable fan according to claim 1, wherein the fan blade assemblies are made of polycarbonate material.

* * * * *